UNITED STATES PATENT OFFICE.

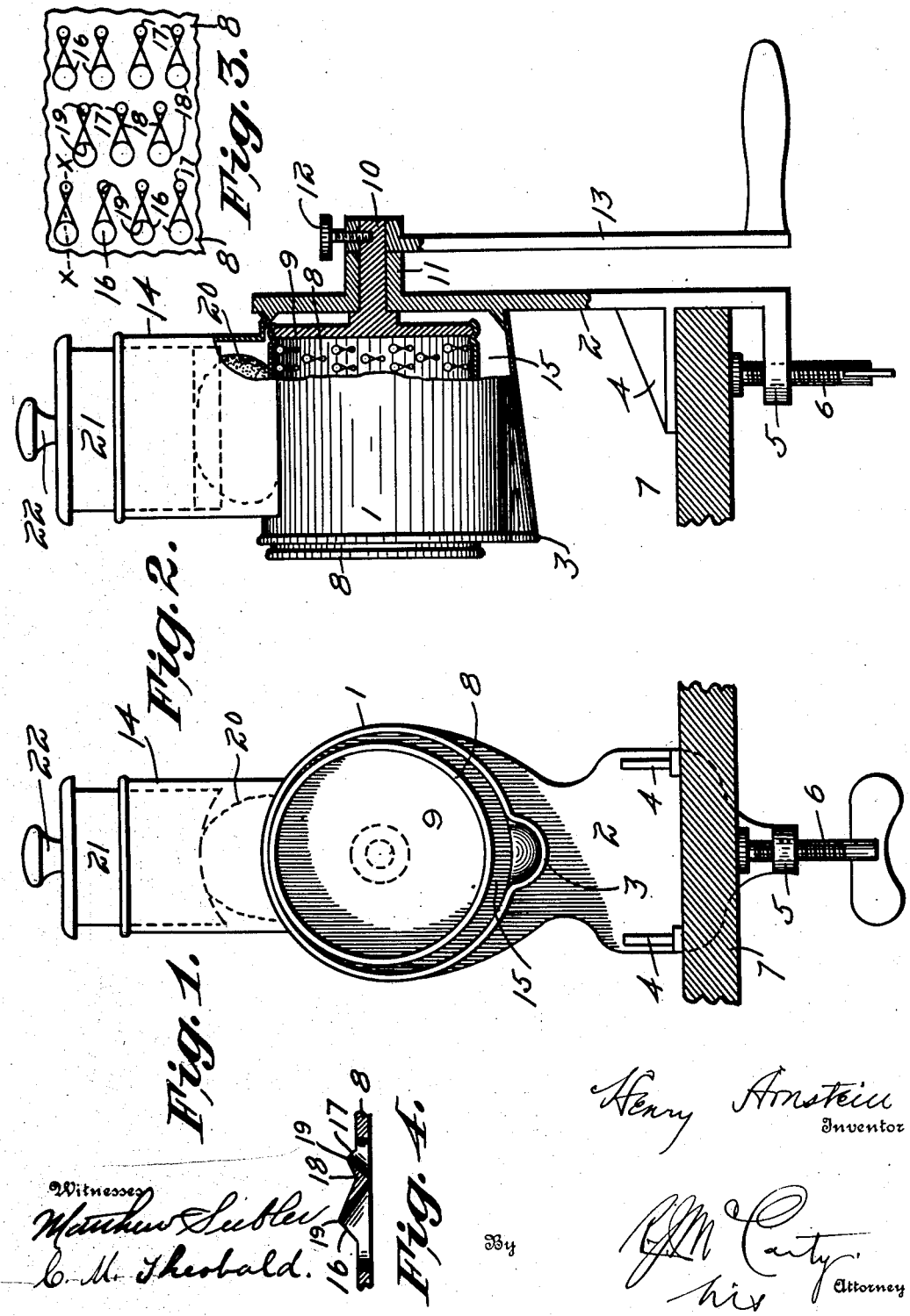

HENRY ARNSTEIN, OF DAYTON, OHIO.

VEGETABLE-GRATER.

No. 913,187.  Specification of Letters Patent.  Patented Feb. 23, 1909.

Application filed November 9, 1907. Serial No. 401,414.

*To all whom it may concern:*

Be it known that I, HENRY ARNSTEIN, a citizen of the United States, residing at Dayton, in the county of Montgomery and State of Ohio, have invented certain new and useful Improvements in Vegetable-Graters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in graters of the type employed for grating vegetables, etc., and possesses the new and useful features hereinafter described and claimed.

The object of the invention is to provide a grater which is of simplified construction and efficient in its operation, and which is also comparatively inexpensive in manufacturing.

Preceding a detail description of the invention, reference is made to the accompanying drawings, of which—

Figure 1, is an elevation of my improved grater showing the manner of nesting the grating cylinder and the cylindrical casing. Fig. 2, is an elevation at right angles to Fig. 1 with a portion of the cylindrical casing broken away. Fig. 3, is an illustration of a portion of the grating cylinder enlarged to exemplify the construction of the differential grating teeth or projections. Fig. 4, is a sectional view of a portion of the grating cylinder on the line $x$ $x$ of Fig. 3.

In a detail description of the invention, similar reference characters indicate corresponding parts.

The cylindrical casing 1 is of an outwardly flaring form from the point where it is united to its supporting standard 2, and the lower side of said casing is provided with a discharge spout 3 from which the grated substance passes from the grater. The lower portion of the standard 2 is provided with feet 4 and 5, the latter of which is provided with an aperture to receive a thumb screw adapted to clamp the device upon the edge 7 of a table or other supporting article.

The grating cylinder 8 is of circular form of substantially uniform diameter and is suitably united to a disk 9 which terminates in a shaft 10 having a bearing 11 in the upper portion of the standard 2. Connected to the projecting end of the shaft 10 by means of a set screw 12, is a crank handle 13, by means of which the grating cylinder 8 is rotated.

The axis of the grating cylinder is eccentric to the axis of the outer casing or cylinder 1 to provide a desirable space 15 between the sides and lower portion of the grating cylinder and the outer casing to provide suitable space for the grated material to discharge from the grating cylinder. It will also be observed that the upper surface of the grating cylinder and the casing lie in close proximity to each other in order that the article operated upon shall be properly engaged to reduce it to the form of a grated substance in the rotation of the cylinder.

The grating cylinder has a capacity of grating the substance coarser or finer as may be desired; this capacity is due to the differential grating teeth or projections 16 and 17 which are formed throughout the body of the grating cylinder by punching circular openings in said body outwardly in two different degrees or sizes of formation. Each two of these grating formations lie in a position transverse to the axis of the cylinder, and each two of said grating teeth or projections are joined by an intervening solid portion 18 of the cylinder. In order to grate the article by one set of teeth, for example—the larger teeth 16, the grating cylinder is rotated in one direction, while to grate the article with the smaller or finer teeth the said cylinder is rotated in the opposite direction. The cutting edges of the teeth lie inwardly from the outer edges of the openings in the cylinder as indicated at 19—Fig. 3, in order that the opposite rotations of the grating cylinder shall operate upon the article to be grated in the manner above indicated. The hopper 14 projecting from the upper portion of the outer cylindrical casing 1, communicates with the interior of said casing so that the grating cylinder 8 shall be exposed to the article 20 within said hopper. The article in the present instance represents a potato 20 which rests upon the periphery of the grating cylinder and is maintained in suitable contact with said grating cylinder by means of a presser 21 in the form of a block which fits into the mouth of the hopper 14 and is provided with a knob 22 upon which the hand of the operator presses while the other hand rotates the crank handle 13.

I claim:

A vegetable grater, comprising a cylindrical casing with a hopper joined thereto, of a cylindrical grating cylinder rotatable within said casing, said grating cylinder having its surface provided throughout with two series of differential grating teeth formed by stamping two series of differential circular openings in the body of said cylinder, the sizes of the resulting teeth corresponding to the diameters of the circular openings, and the grating edges of one series of said teeth lying in opposite direction to the grating edges of the other series of teeth, so that when the cylinder is rotated in one direction, the threads grated from the article operated upon, will be larger than the threads grated when the cylinder is rotated in the opposite direction, as herein shown and described.

In testimony whereof I affix my signature, in presence of two witnesses.

HENRY ARNSTEIN.

Witnesses:
R. J. McCarty,
C. M. Theobald.